United States Patent
Hsiang

(10) Patent No.: US 12,328,429 B2
(45) Date of Patent: Jun. 10, 2025

(54) METHODS AND APPARATUSES OF INTER CODING FOR PICTURES PARTITIONED INTO SUBPICTURES IN VIDEO CODING SYSTEMS

(71) Applicant: HFI Innovation Inc., Zhubei (TW)

(72) Inventor: Shih-Ta Hsiang, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 176 days.

(21) Appl. No.: 18/166,102

(22) Filed: Feb. 8, 2023

(65) Prior Publication Data

US 2023/0188717 A1 Jun. 15, 2023

Related U.S. Application Data

(63) Continuation of application No. 17/343,914, filed on Jun. 10, 2021, now Pat. No. 11,601,647.

(60) Provisional application No. 63/037,686, filed on Jun. 11, 2020, provisional application No. 63/037,596, filed on Jun. 10, 2020.

(51) Int. Cl.
| | |
|---|---|
| *H04N 19/119* | (2014.01) |
| *H04N 19/105* | (2014.01) |
| *H04N 19/159* | (2014.01) |
| *H04N 19/172* | (2014.01) |

(Continued)

(52) U.S. Cl.
CPC ......... *H04N 19/119* (2014.11); *H04N 19/105* (2014.11); *H04N 19/159* (2014.11); *H04N 19/172* (2014.11); *H04N 19/70* (2014.11); *H04N 19/96* (2014.11)

(58) Field of Classification Search
CPC .. H04N 19/105; H04N 19/119; H04N 19/159; H04N 19/172; H04N 19/70; H04N 19/96
See application file for complete search history.

(56) References Cited

U.S. PATENT DOCUMENTS

| | | |
|---|---|---|
| 11,368,679 B2 | 6/2022 | Zheng et al. |
| 2021/0136407 A1 | 5/2021 | Aono et al. |

(Continued)

FOREIGN PATENT DOCUMENTS

| | | |
|---|---|---|
| CN | 110832868 A | 2/2020 |
| CN | 110832869 A | 2/2020 |

OTHER PUBLICATIONS

Chinese language office action dated May 12, 2022, issued in application No. TW 110121141.

(Continued)

*Primary Examiner* — Farzana Hossain
(74) *Attorney, Agent, or Firm* — McClure, Qualey & Rodack, LLP

(57) ABSTRACT

Video processing methods and apparatuses include receiving input video data associated with a current picture, signaling or parsing a first syntax element, wherein the first syntax element indicates whether to infer or predict subpicture information of a current layer of the current picture from a target layer; signaling or parsing a second syntax element to determine information about the target layer for obtaining the subpicture information of the current layer of the current picture, and encoding or decoding the current layer of the current picture using the subpicture information of the current layer of the current picture.

4 Claims, 7 Drawing Sheets

(51) Int. Cl.
*H04N 19/70* (2014.01)
*H04N 19/96* (2014.01)

(56) References Cited

U.S. PATENT DOCUMENTS

| | | | |
|---|---|---|---|
| 2021/0195186 A1* | 6/2021 | Wu | H04N 19/70 |
| 2021/0329252 A1 | 10/2021 | Zheng et al. | |
| 2021/0360290 A1* | 11/2021 | Seregin | H04N 19/70 |
| 2021/0368208 A1* | 11/2021 | Samuelsson | H04N 19/70 |
| 2021/0392332 A1* | 12/2021 | Choi | H04N 19/132 |
| 2022/0150487 A1 | 5/2022 | Lim et al. | |
| 2022/0182681 A1 | 6/2022 | Paluri et al. | |
| 2022/0217342 A1 | 7/2022 | Hannuksela | |
| 2024/0137571 A1* | 4/2024 | Deng | H04N 19/188 |
| 2024/0305828 A1* | 9/2024 | Deshpande | H04N 19/119 |

OTHER PUBLICATIONS

Bross, B., et al.; Versatile Video Coding (Draft 8); Joint Video Experts Team (JVET) of ITU-T SG 16 WP 3 and ISO/JEC JTC 1/SC 29/WG 11; Jan. 2020; pp. 1-514.
Chinese language office action dated Apr. 27, 2022, issued in application No. TW 110121364.
Non-Final Office Action dated Aug. 29, 2022, issued in U.S. Appl. No. 17/343,897 (copy not provided).

* cited by examiner

CTU   Tile   Slice

METHODS AND APPARATUSES OF INTER CODING FOR PICTURES PARTITIONED INTO SUBPICTURES IN VIDEO CODING SYSTEMS

CROSS REFERENCE TO RELATED APPLICATIONS

This application is a continuation of application Ser. No. 17/343,914, filed Jun. 10, 2021, which claims priority to U.S. Provisional Patent Application Ser. No. 63/037,596, filed on Jun. 10, 2020, entitled "Methods and apparatus for signaling information on subpictures for coding image and video data", and U.S. Provisional Patent Application Ser. No. 63/037,686, filed on Jun. 11, 2020, entitled "Methods and apparatus for coding inter coding sub-pictures". The U.S. Provisional Patent Applications are hereby incorporated by reference in their entireties.

FIELD OF THE INVENTION

The present invention relates to inter coding methods and apparatuses for encoding or decoding video data. In particular, the present invention relates to inter coding for pictures partitioned into subpictures for video coding systems.

BACKGROUND AND RELATED ART

The High Efficiency Video Coding (HEVC) standard is the latest international video coding standard developed by the Joint Collaborative Team on Video Coding (JCT-VC) group of video coding experts from ITU-T Study Group. The HEVC standard relies on a block-based coding structure which splits each video picture into multiple non-overlapped square Coding Tree Units (CTUs). A coded picture can be represented by a collection of slices, each comprising an integer number of CTUs. Each individual CTU in a slice is processed in a raster scanning order. In the HEVC main profile, the maximum and the minimum sizes of a CTU are specified by syntax elements signaled in a Sequence Parameter Set (SPS). A Bi-predictive (B) slice may be decoded using intra prediction or inter prediction with at most two motion vectors and reference indices to predict sample values of each block in the B slice. A Predictive (P) slice is decoded using intra prediction or inter prediction with at most one motion vector and reference index to predict sample values of each block in the P slice. An Intra (I) slice is decoded using intra prediction only.

Each CTU is further recursively partitioned into one or more non-overlapped Coding Units (CUs) using quadtree (QT) splitting structure in order to adapt various local characteristics. At each partition depth of the QT splitting structure, an N×N block is either a single leaf CU or split into four smaller blocks with equal size N/2×N/2. The CTU with the size M×M pixel samples is the root node of a quadtree coding tree, and the four M/2×M/2 blocks are the child quadtree nodes split from the root node. Each of the four M/2×M/2 blocks may become a parent node partitioned by another QT splitting to result in four child nodes with further reduced size by half in each spatial dimension. If a coding tree node is not further split, it is called a leaf CU. The leaf CU size is restricted to be larger than or equal to a minimum allowed CU size, which is also specified in the SPS. An example of a recursive quadtree splitting structure for a CTU is illustrated in FIG. 1, where the solid lines indicate CU boundaries in the CTU.

Once the CTUs are partitioned into leaf CUs, each leaf CU is subject to further split into one or more Prediction Units (PUs) according to a PU splitting type for prediction according to the HEVC standard. Unlike the recursive quadtree splitting for CUs, each leaf CU may only be split once to form one or more PUs. The PU and associated CU syntax work as a basic representative block for sharing prediction information as the same prediction process is applied to all pixel samples in the PU. The specified prediction process is employed to predict the values of the associated pixel samples inside the PU. The prediction information is conveyed to the decoder on a PU basis. After obtaining residues generated by the prediction process based on the PU splitting type, the residues belong to a leaf CU is partitioned into one or more Transform Units (TUs) according to a Residual quadtree (RQT) splitting structure for transforming the residues into transform coefficients for compact data representation. The dashed lines in FIG. 1 indicate TU boundaries in the CTU. The TU is a basic representative block for applying transform and quantization on the residual data or transform coefficients. A TU is composed of a Transform Block (TB) of luminance (luma) samples of size 8×8, 16×16, or 32×32 or four TBs of luma samples of size 4×4, and two corresponding TBs of chrominance (chroma) samples in a picture coded by a 4:2:0 color format. For each TU, a transform matrix having the same size as the TU is applied to the residues to generate transform coefficients, and these transform coefficients are quantized and conveyed to the decoder on a TU basis. FIG. 2 illustrates an example of a corresponding QT representation for the block partitioning structure as shown in FIG. 1. The solid lines indicate CU boundaries and the dashed lines indicate TU boundaries within the CTU.

The terms Coding Tree Block (CTB), Coding block (CB), Prediction Block (PB), and TB are defined to specify two-dimensional (2-D) sample array of one color component associated with the CTU, CU, PU, and TU respectively. For example, a CTU consists of one luma CTB, two chroma CTBs, and its associated syntax elements. A similar relationship is valid for CU, PU, and TU. In the HEVC standard, the same quadtree splitting structure is generally applied to both luma and chroma components unless a minimum size for the chroma block is reached.

The Versatile Video Coding (VVC) standard is the latest video coding standard developed by the Joint Collaborative Team on Video Coding (JCT-VC) group of video coding experts from ITU-T Study Group. In the VVC Draft, a picture is divided into one or more tile rows and one or more tile columns, and a tile is a sequence of CTUs that covers a rectangular region within a particular tile column and a particular tile row in the picture. The feature of tiles was mainly for parallel processing purposes, and tile partitioned rectangular slices forming subpictures may also be used in viewport based 360 degrees video applications. The processing order for tile partition of a picture is tile raster scan within the picture and CTU raster scan within a tile. Tiles break in-picture prediction dependencies as well as entropy decoding dependencies. A slice consists of an integer number of complete tiles or an integer number of consecutive complete CTU rows within a tile of a picture. The feature of slices is mainly used for subpicture level access and ultralow delay. Raster scan slice mode and rectangular slice mode are two slice structure modes supported in the VVC standard, indicated by a syntax element rect_slice_flag. Rectangular slices are always in a rectangular shape while raster scan slices may or may not be in a rectangular shape. In the raster scan slice mode, a slice contains a sequence of complete tiles of a picture in a tile raters scan order. Tiles within a raster scan slice are processed in a tile raster scan order within the raster scan slice. In the rectangular slice mode, a slice contains either a number of complete tiles that collectively form a rectangular region of the picture of a number of consecutive complete CTU rows of one tile that collectively form a rectangular region of the picture. Tiles within a rectangular slice are processed in a tile raster scan order with the rectangular region corresponding to that rectangular slice. Each subpicture in a picture contains one or more slices that collectively cover a rectangular region of the picture, and each subpicture contains multiple complete CTUs. Subpictures in a picture allow independent coding and extraction of a rectangular subset of a sequence of coded pictures for use cases like viewport-dependent 360 degrees video streaming optimization and region of interest applications. Subpictures allow motion vectors of a coding block pointing outside of the subpicture even when the subpicture is extractable, thus allowing padding at subpicture boundaries as picture boundaries.

FIG. 3 illustrates an example of tiles in raster scan slices, where a picture is divided into 12 tiles contained in 3 raster scan slices. There are 3 tile columns and 4 tile rows in the picture as shown in FIG. 2, and each tile consists of 18 CTUs. A first slice of the picture consists of the first 2 tiles in a tile raster scan order, a second slice consists of five consecutive tiles in the tile raster scan order, and a third slice consists of the remaining 5 tiles. FIG. 4 illustrates an example of tiles in rectangular slices, where the picture is divided into 24 tiles contained in 9 rectangular slices. There are 6 tile columns and 4 tile rows in this example. Except for the fourth, fifth, and sixth rectangular slices each having 4 tiles, all other rectangular slices are consisting of 2 tiles. FIG. 5 shows an example of subpicture partitioning of a picture, where the picture is partitioned into 18 tiles and 24 subpictures of varying dimensions. The tile boundaries are illustrated by bold lines and the subpicture boundaries are illustrated by dashed lines. In the example shown in FIG. 5, each subpicture contains only one slice.

BRIEF SUMMARY OF THE INVENTION

Embodiments of video processing methods for a video encoding or decoding system receive input data associated with a current picture composed of multiple Coding Tree Units (CTUs) for encoding or decoding, partition the current picture into one or more subpictures, determine one or more reference pictures for inter coding the current picture, and encoding or decoding one or more blocks in one or more CTUs of the current picture by inter coding using the one or more reference pictures. Each subpicture contains multiple complete CTUs, and boundaries of the subpictures are aligned with grids of the current picture in units of CTUs. Each reference picture has a same CTU size as the current picture when the reference picture is not an Inter Layer Reference Picture (ILRP).

In some embodiment, the step of determining one or more reference pictures for inter coding the current picture further includes determining if each reference picture is partitioned into multiple subpictures, and the reference picture used for inter coding the current picture must have the same CTU size as the current picture when the reference picture is not an ILRP containing one subpicture and the reference picture is partitioned into multiple subpictures. Each reference picture is determined to be partitioned into multiple subpictures when a SPS level syntax element sps_num_subpics_minus1 is greater than 0 for a SPS referred to by the reference picture. That is, it is a requirement of bitstream conformance that the reference picture used for inter coding the current picture shall use the same CTU size as the current picture when the SPS level syntax element sps_num_subpics_minus1 is greater than 0 for the SPS referred to by the reference picture.

In some embodiments, a SPS level syntax element sps_log2_ctu_size_minus5 signaled in a SPS or parsed from a SPS is used to derive a CTU size, and a same value of sps_log2_ctu_size_minus5 for a reference picture and the current picture indicates that reference picture uses the same CTU size as the current picture.

Each subpicture in the current picture may be treated as a picture during encoding or decoding according to an embodiment, and the step of encoding or decoding one or more blocks in one or more CTUs of the current picture by inter coding using the reference pictures further includes determining if each subpicture is treated as a picture. In cases when a current subpicture is treated as a picture and when each reference picture is not an ILRP containing one subpicture, the current subpicture is coded by inter coding one or more blocks of the current subpicture using one or more reference pictures having the same CTU size as that of the current picture. In cases when the current subpicture is not treated as a picture, the current subpicture is coded by inter coding one or more blocks of the current subpicture using one or more reference pictures without constraining each reference picture to have the same CTU size as the current picture.

In some preferred embodiments, each reference picture used for inter coding the current picture not only has a same CTU size as the current picture, it also has a same subpicture layout as the current picture when the reference picture is not an ILRP containing one subpicture. Each reference picture and the current picture having the same subpicture layout when a number of subpictures in each reference picture is the same as a number of subpictures in the current picture, and a top-left position and size of each subpicture in each reference picture is the same as a top-left position and size of each subpicture in the current picture. For example, a SPS level syntax element sps_log2_ctu_size_minus5 referred to by each reference picture is the same as a SPS level syntax element sps_log2_ctu_size_minus5 referred to by the current picture when the reference picture is not an ILRP containing one subpicture, a SPS level syntax element sps_num_subpics_minus1 referred to by each reference picture is the same as the SPS level syntax element sps_num_subpics_minus1 referred to by the current picture when the reference picture is not an ILRP containing one subpicture, and SPS level syntax element sps_subpic_ctu_top_left_x[j], sps_subpic_ctu_top_left_y[j], sps_subpic_width_minus1[j], and sps_subpic_height_minus1[j] for each subpicture in each reference picture are having the same values as corresponding SPS level syntax elements for each subpicture in the current picture when the reference picture is not an ILRP containing one subpicture.

In one embodiment, the current picture is in a current layer and the one or more reference pictures are pictures in one or more other layers that can be referenced by the current layer. Each of the reference pictures is referred to by an active entry in a reference picture list 0 or reference picture list 1 for predicting one or more blocks of the current picture.

Aspects of the disclosure further provide an apparatus for a video encoding or decoding system. Some embodiments of the apparatus receive input video data associated with a current picture, wherein the current picture is composed of a plurality of CTUs for encoding or decoding, partition the current picture into multiple subpictures, determine one or more reference pictures for inter coding the current picture, where each reference picture has a same CTU size as the current picture when the reference picture is not an ILRP containing one subpicture, and encode or decode one or more blocks in one or more CTUs of the current picture by inter coding using the one or more reference pictures. Each subpicture contains multiple CTUs and boundaries of the subpictures are aligned with grids in a unit of CTUs. A non-transitory computer readable medium storing program instruction causing a processing circuit of an apparatus to perform a video processing method for pictures partitioned into subpictures. The video processing method includes receiving input video data of a current picture composing multiple CTUs, partitioning the current picture into subpictures, determining one or more reference pictures for inter coding the current picture having the same CTU size as the current picture when the reference picture is not an ILRP containing one subpicture, and encoding or decoding one or more blocks in one or more CTUs of the current picture by inter coding using the one or more reference pictures.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

Figure 1:
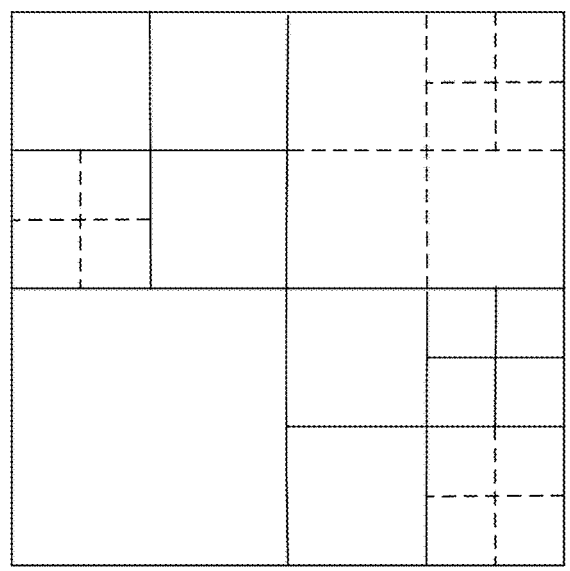
FIG. 1 illustrates an exemplary coding tree for splitting a Coding Tree Unit (CTU) into Coding Units (CUs) and splitting each CU into one or more Transform Units (TUs) according to a quadtree splitting structure.
Figure 2:
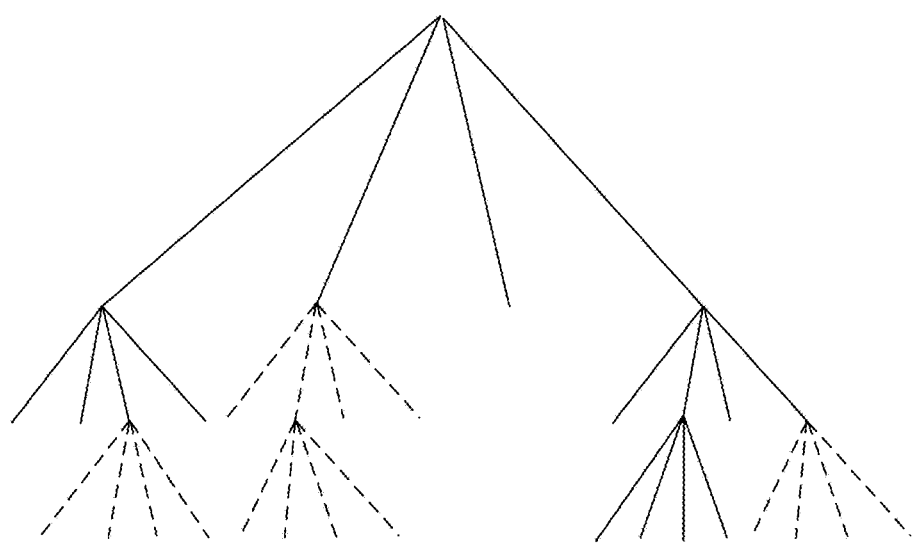
FIG. 2 illustrates a corresponding quadtree representation for the block partitioning structure as shown in FIG. 1.
Figure 3:
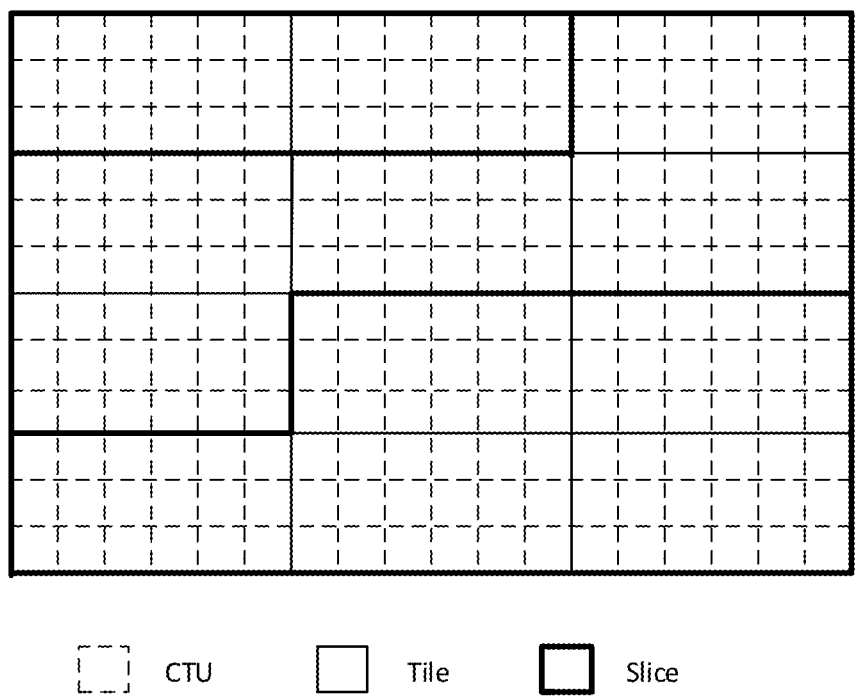
FIG. 3 illustrates an example of applying raster scan slice partitioning to divide a picture into 12 tiles and 3 raster scan slices.
Figure 4:
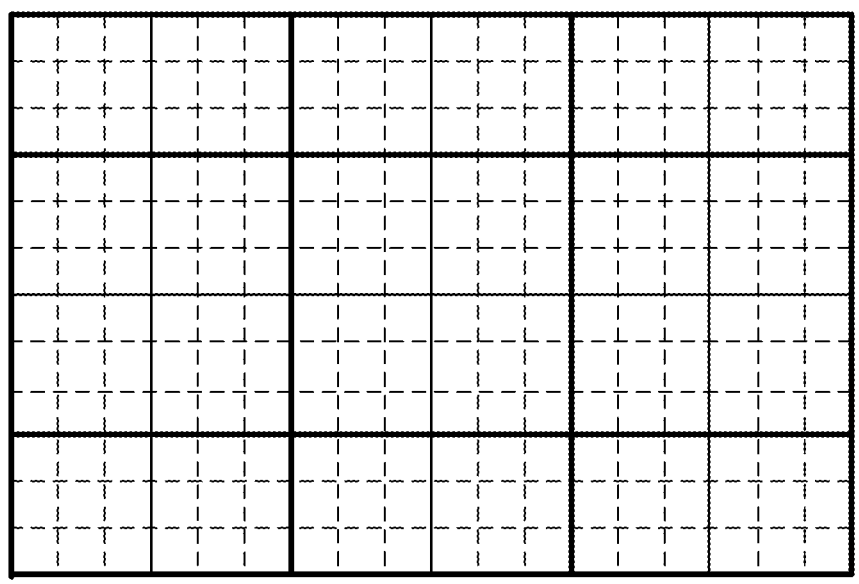
FIG. 4 illustrates an example of applying rectangular slice partitioning to divide a picture, into 24 tiles and 9 rectangular slices.
Figure 4:
Figure 4:
Figure 4:
Figure 5:
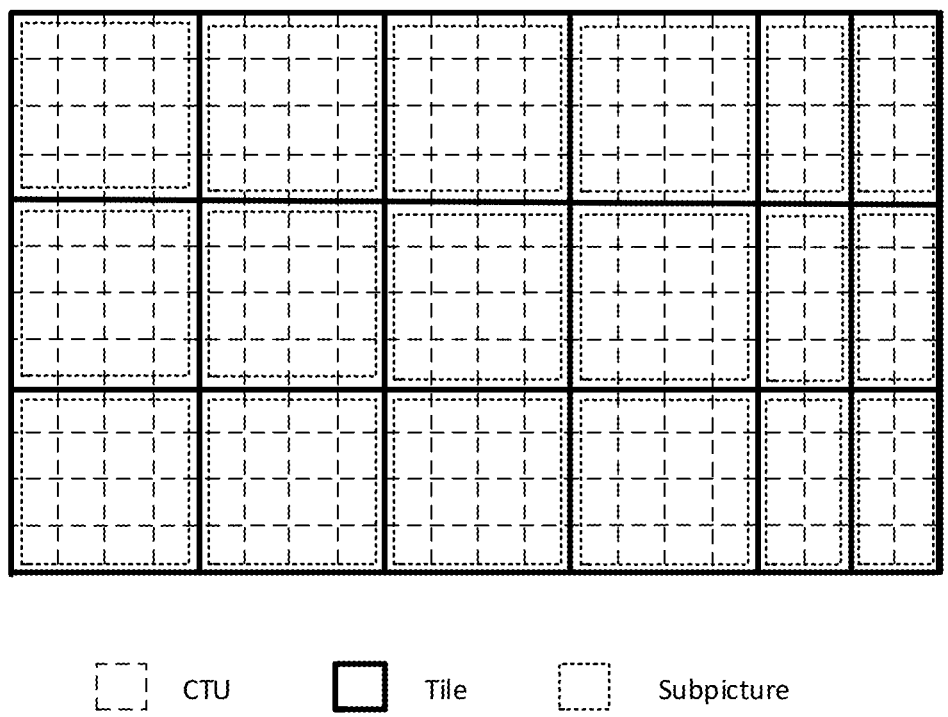
FIG. 5 illustrates an example of partitioning a picture into 18 tiles and 24 subpictures/slices.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

Valid Reference Pictures for Inter Coding Pictures having Subpictures According to the VVC standard, a subpicture contains one or more slices that collectively cover a rectangular region of a picture. A Sequence Parameter Set (SPS) level syntax element sps_num_subpics_minus1 signaled in a SPS is used to indicate a number of subpictures in each picture referring to the SPS. Each picture referring to the SPS is not partitioned into multiple subpictures when this SPS level syntax element sps_number_subpics_minus1 is equal to 0. The position and size of each subpicture for pictures referred to by the SPS is also signaled in the SPS, where the subpicture layout in a picture is specified based on the grid of the current picture in units of CTUs. In VVC Draft 9, a subpicture i is treated as a picture for a decoding process when a corresponding flag_sps_subpic_treated_as_pic_flag[i] is equal to 1, and when a current subpicture is treated as a picture, a reference pictures used for inter coding the current subpicture must meet one of the following two conditions. The first condition is when the reference picture is divided into subpictures (sps_num_subpics_minus1>0) and has the same subpicture layout as that of the current picture. The second condition is when the reference picture is not divided into subpictures (sps_num_subpics_minus1=0) and corresponds to a different layer. In the first condition, in order to have the same subpicture layout, it is a bitstream conformance requirement that the reference picture and current picture have the same values of syntax elements sps_num_subpics_minus1, pps_pic_width_in_luma_samples, and pps_pic_height_in_luma_samples, as well as the same values of sps_subpic_ctu_top_left_x[j], sps_subpic_ctu_top_left_y[j], sps_subpic_width_minus1[j], sps_subpic_height_minus1[j], and sps_subpic_treated_as_pic_flag[j], respectively, for each value of j.

Some embodiments of the present invention further define a valid reference picture that can be used for inter coding a current picture having multiple subpictures by considering a Coding Tree Unit (CTU) size. Inter coding includes inter layer coding for pictures coded in different layers, inter picture coding for pictures in different time instances, or both. A reference picture is a valid reference picture for the current picture only if this reference picture fulfills one or more predefined requirements. Each active entry of a reference picture list 0 or reference picture list 1 for a current picture must be a valid reference picture. In some embodiments, one of the predefined requirements for defining whether a reference picture is a valid reference picture for predicting a current picture partitioned into subpictures is related to a Coding Tree Unit (CTU) size. In one embodiment, when the syntax element sps_num_subpics_minus1 is greater than 0 for the SPS referred to by a reference picture, it is a requirement of bitstream conformance that the reference picture used for inter coding the current picture shall use the same CTU size as the current picture. That is, the reference picture is a valid reference picture and an active entry of a reference picture list for predicting one or more blocks in the current picture only when the CTU size of the reference picture is the same as the CTU size of the current picture. For example, a SPS level syntax element sps_log2_ctu_size_minus5 is signaled in a SPS for deriving a CTU size of the coded picture and is related to a scaling factor of the subpicture layout. When the syntax element sps_num_subpics_minus1 is greater than 0 for the SPS referred to by a reference picture, it is a requirement of bitstream conformance that the reference picture used for inter coding the current picture shall have the same value of sps_log2_ctu_size_minus5 as the current picture indicating the reference picture uses the same CTU size as the current picture.

In some embodiments of the present invention, each reference picture has to satisfy one of the following two conditions for inter subpicture coding. The first condition is that the current picture and reference picture are having the same subpicture layout including having the same CTU size. The second condition is that the reference picture is an Inter Layer Reference Picture (ILRP) containing only one subpicture.

In a specific embodiment, the requirement of bitstream conformance is only applied to decoding a current subpicture with a subpicture index subPicIdx and sps_subpic_treated_as_pic_flag[subPicIdx] is equal to 1. The current subpicture is treated as a picture for a decoding process when the corresponding flag sps_subpic_treated_as_pic_flag is equal to 1. For example, a video decoding system determines if a current subpicture in a current picture is treated as a picture according to a corresponding flag parsed from a SPS referred by the current picture, and encodes or decodes the current subpicture by inter coding one or more blocks of the current subpicture using one or more reference pictures having the same CTU size as the current picture when the current subpicture is treated as a picture. In cases when the current subpicture is not treated as a picture, the current subpicture is encoded or decoded by inter coding one or more blocks of the current subpicture using one or more reference pictures without constraining each reference picture to have the same CTU size as the current picture.

In an embodiment of the present invention, some other predefined requirements for defining whether a reference picture is a valid reference picture for predicting one or more blocks of a current picture partitioned into subpictures are related to a subpicture layout of the reference picture. In this embodiment, when the syntax element sps_num_subpcs_minus1 is greater than 0 for the SPS referred to by a reference picture, it is a requirement of bitstream conformance that the reference picture used for inter coding the current picture shall have the same CTU size and the same subpicture layout as that of the current picture. For example, the SPS level syntax element sps_log2_ctu_size_minus5 referred to by the reference picture is the same as the SPS level syntax element sps_log2_ctu_size_minus5 referred to by the current picture, indicating the CTU size is the same for the reference picture and the current picture. Similarly, the SPS level syntax element sps_num_subpics_minus1 referred to by the reference picture is the same as the SPS level syntax element sps_num_subpics_minus1 referred to by the current picture, indicating the number of subpictures in the reference picture is the same as the number of subpictures in the current picture. Various SPS level syntax elements including sps_subpic_ctu_top_left_x[j], sps_subpic_ctu_top_left_y[j], sps_subpic_width_minus1[j], and sps_subpic_height_minus1[j] for each subpicture in the reference picture are having the same values as the SPS level syntax elements sps_subpic_cut_top_left_x[j], sps_subpic_ctu_top_left_y[j], sps_subpic_width_minus1[j], and sps_subpic_height_minus1[j] for each subpicture in the current picture, indicating a top-left position and a size of each subpicture in the reference picture is the same as a top-left position and a size of each subpicture in the current picture.

In some embodiments of the present invention, a current picture is a picture in a current layer, and a reference picture used for inter coding the current picture having the same CTU size as that of the current picture is a picture in another layer that can be referred by the current layer. Each reference picture is referred to by an active entry in a reference picture list 0 (RefPicList[0]) or reference picture list 1 (RefPicList[1]) for predicting one or more blocks of the current picture. According to a preferred embodiment, each reference picture referred to by an active entry in RefPicList[0] or RefPicList[1] and the current picture must have the same value for a picture width, a picture height, a number of subpictures, a CTU size, and a top-left position and size of each subpicture. Similarly, the current picture in a current layer and any picture that is in another layer that has the current picture in an active entry in a reference picture list 0 or reference picture list 1 have the same value for a CTU size according to some other embodiments. The current picture and any picture that is in another layer that has the current picture in an active entry in RefPicList[0] or RefPicList[1] have the same value for a picture width, a picture height, a number of subpictures, a CTU size, and a top-left position and size of each subpicture according to a preferred embodiment.

An embodiment of the syntax and semantic modifications to VVC Draft 9 according to a proposed aspect of the present invention with modified parts marked by underline are illustrated as follows.

7.4.3.3 Sequence Parameter Set RBSP Semantics sps_subpic_treated_as_pic_flag[i] equal to 1 specifies that the i-th subpicture of each coded picture in the CLVS is treated as a picture in the decoding process excluding in-loop filtering operations. sps_subpic_treated_as_pic_flag[i] equal to 0 specifies that the i-th subpicture of each coded picture in the CLVS is not treated as a picture in the decoding process excluding in-loop filtering operations. When not present, the value of sps_subpic_treated_as_pic_flag[i] is inferred to be equal to 1.

When sps_num_subpics_minus1 is greater than 0 and sps_subpic_treated_as_pic_flag[i] is equal to 1, for each CLVS of a current layer referring to the SPS, let targetAuSet be all the Access Units (AUs) starting from the AU containing the first picture of the CLVS in decoding order, to the AU containing the last picture of the CLVS in decoding order, inclusive, it is a requirement of bitstream conformance that all of the following conditions are true for the targetLayerSet that consists of the current layer and all the layers that have the current layer as a reference layer:

For each AU in targetAuSet, all pictures of the layers in targetLayerSet shall have the same value of pps_pic_width_in_luma_samples and the same value of pps_pic_height_in_luma_samples.

All the SPSs referred to by the layers in targetLayerSet shall have the same value of sps_log2_ctu_size_minus5 and the same value of sps_num_subpics_minus1 and shall have the same values of sps_subpic_ctu_top_left_x[j], sps_subpic_ctu_top_left_y[j], sps_subpic_width_minus1[j], sps_subpic_height_minus1[j], and sps_subpic_treated_as_pic_flag[j], respectively, for each value of j in the range of 0 to sps_num_subpics_minus1, inclusive.

For each AU in targetAuSet, all pictures of the layers in targetLayerSet shall have the same value of SubpicIdVal[j] for each value of j in the range of 0 to sps_num_subpics_minus1, inclusive.

8.3.2 Decoding Process for Reference Picture Lists Construction

When vps_independent_layer_flag[GeneralLayerIdx[nuh_layer_id]] is equal to 0 and sps_num_subpics_minus1 is greater than 0, either of the following two conditions (but not both) shall be true:

The picture referred to by each active entry in RefPicList[0] or RefPicList[1] has the same subpicture layout as the current picture (i.e., the SPSs referred to by that picture and the current picture have the same value of sps_log2_ctu_size_minus5 and the same value of sps_num_subpics_minus1 and the same values of sps_subpic_ctu_top_left_x[j], sps_subpic_ctu_top_left_y[j], sps_subpic_width_minus1[j], and sps_subpic_height_minus1[j], respectively, for each value of j in the range of 0 to sps_num_subpics_minus1, inclusive).

The picture referred to by each active entry in RefPicList[0] or RefPicList[1] is an ILRP for which the value of sps_num_subpics_minus1 is equal to 0.

Figure 6:
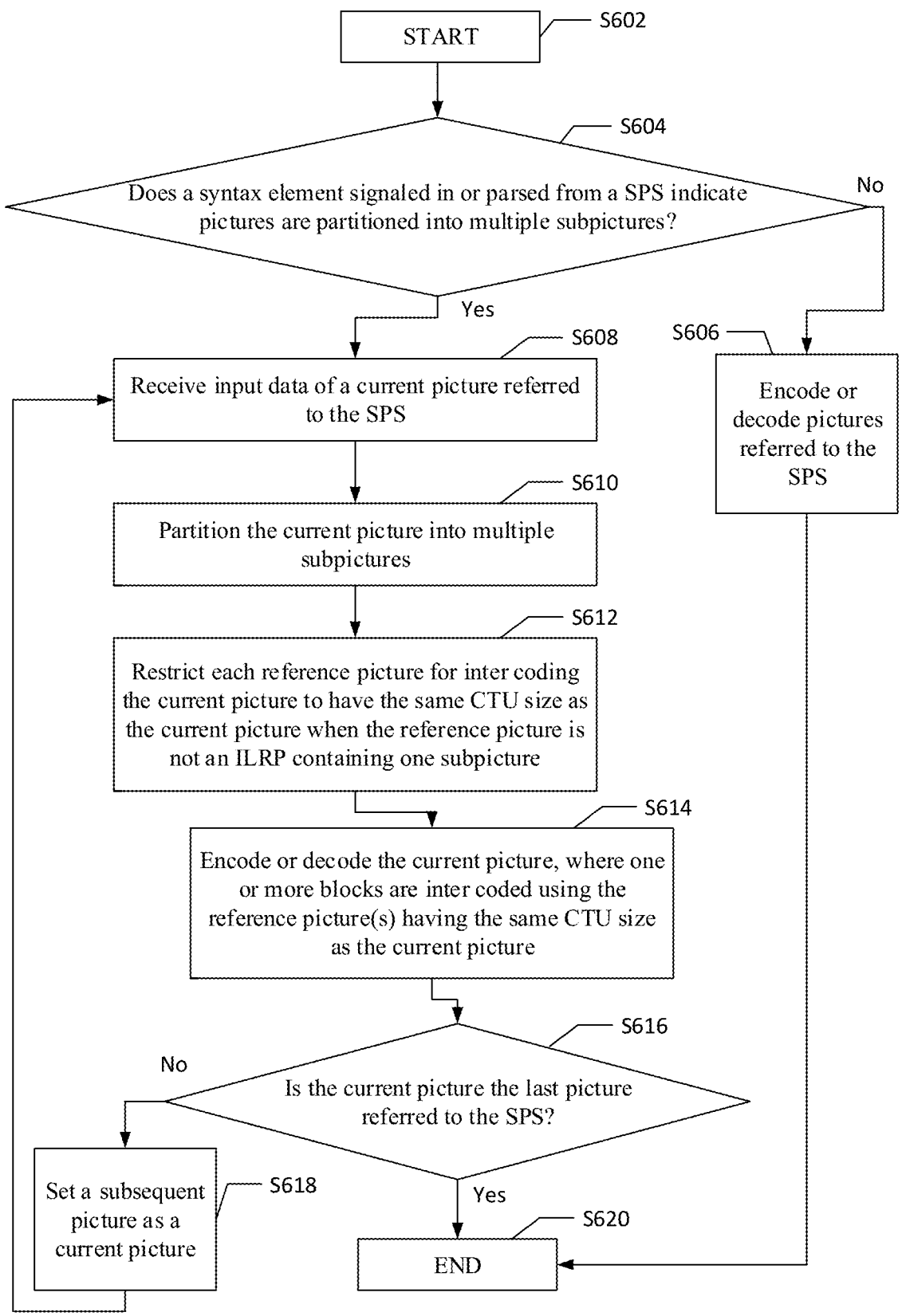
FIG. 6 is a flowchart of processing video data in pictures referred to a SPS according to an embodiment of the present invention.

Representative Flowchart for an Embodiment of Present Invention FIG. 6 is a flowchart illustrating an embodiment of a video encoding or decoding system processing input video data by restricting a reference picture having a same CTU size as that of the current picture for inter subpicture coding when the reference picture is not an Inter Layer Reference Picture (ILRP) containing one subpicture. The video encoding or decoding system starts encoding or decoding pictures referring to a Sequence Parameter Set (SPS) in step S602. In step S604, the video encoding or decoding system checks a SPS level syntax element signaled in or parsed from the SPS indicating whether each picture referred to the SPS is partitioned into multiple subpictures. For example, each picture referred to the SPS is partitioned into multiple subpictures when a SPS level syntax element sps_num_subpics_minus1 is greater than 0. If the SPS level syntax element indicates each picture referred to the SPS is not further partitioned into multiple subpictures, the video encoding or decoding system encodes or decodes the pictures referred to the SPS in step S606. Otherwise, if the SPS level syntax element indicates each picture referred to the SPS is partitioned into multiple subpictures, input data of a current picture referred to the SPS are received in step S608. The current picture is partitioned into multiple subpicture according to a subpicture layout in step S610. For example, various syntax elements parsed from or signaled in the SPS are used to define the subpicture layout. In step S612, each reference picture for inter coding the current picture is restricted to have the same CTU size as that of the current picture when the reference picture is not an ILRP containing one subpicture. For example, only the reference pictures having the same CTU size as that of the current picture are included in a reference picture list 0 or reference picture list 1 for predicting one or more blocks in the current picture. In another embodiment, the video encoding or decoding system further checks if a current subpicture is treated as a picture, and only constrain reference pictures for inter coding the current subpicture to have the same CTU size as that of the current picture when the current subpicture is treated as a picture and when the reference picture is not an ILRP containing one subpicture. The video encoding or decoding system encodes or decodes the current picture, where one or more blocks of the current picture is inter coded using the reference picture(s) in step S614. The video encoding or decoding system checks whether the current picture is the last picture referring to the SPS in step S616, and sets a subsequent picture as a current picture in step S618 if it is not the last picture, and repeats the process from step S608. Otherwise, the video encoding or decoding system finishes encoding or decoding pictures referred to the SPS in step S620.

Inter-layer Inheritance of Subpicture Layout In the VVC Draft, information on subpicture layout is coded in the SPS for coded pictures referring to the SPS. Information on subpicture IDs of the coded picture can also be signaled in the SPS. In some embodiments of the present invention, information on subpicture layout and IDs in a current SPS can be inferred or predicted from the SPS referred to by the reference layer. In one embodiment of the inter-layer inheritance method, when inter-layer coding is enabled for the Coded Layer Video Sequence (CLVS) referring to a current SPS, a first syntax element is signaled to indicate whether to infer or predict syntax information on subpicture layout and subpicture IDs in the current SPS from the SPS referred to by a reference layer. When the first syntax element indicates that syntax information on subpicture layout and subpicture IDs in the current SPS is inferred or predicted from the SPS referred to by a selected reference layer, a second syntax element is further signaled to indicate the selected reference layer for inferring or predicting or predicting the current SPS. The syntax information on subpicture layout and subpicture IDs in the current SPS is then inferred or predicted from the SPS referred to by the selected reference layer. In one example, when the first syntax element is true, the value of each of syntax elements for signaling subpicture layout and subpicture IDs in the current SPS is set equal to the value of each corresponding syntax element in the SPS referred to by the selected reference layer. In one example, the second syntax element for signaling the selected reference layer codes the index to the list of direct reference layers or the index to the list of reference layers that are coded in the Video Parameter Set (VPS). In another example, the second syntax element just codes nuh_layer_id associated with the selected reference layer. In some embodiments, the inter-layer inheritance method allows inferring information on subpicture layout in the current SPS from the reference layer without inferring the information on subpicture IDs.

The inter-layer inheritance method may further comprise a bitstream conformance requirement that the SPS referred to by the selected reference layer shall have subpicture information present (with the syntax element sps_subpic_info_present_flag equal to 1 in the VVC standard). The inter-layer inheritance method may further comprise that bitstream conformance requirement that the current SPS and the SPS referred to by the selected reference layer shall have the same value for each of syntax elements related to picture size and partitioning. In one embodiment based on the VVC Draft, the inter-layer inheritance method may comprise bitstream conformance requirement that the current SPS and the SPS referred to by the selected reference layer shall have same values for syntax elements sps_pic_width_max_in_luma_samples and sps_pic_height_max_in_luma_samples. The inter-layer inheritance method may further comprise the bitstream conformance requirement that the current SPS and SPS referred to by the selected reference layer shall have the same value of syntax element sps_log2_ctu_size_minus5.

An exemplary embodiment of the syntax and semantic modifications to the VVC Draft 9 with modified parts marked in bold is shown in the following.

7.3.2.3 Sequence Parameter Set RBSP Syntax

|  | Descriptor |
|---|---|
| seq_parameter_set_rbsp( ) { |  |
|   sps_seq_parameter_set_id | u(4) |
|   sps_video_parameter_set_id | u(4) |
|   ... |  |
|   if( sps_video_parameter_set_id > 0 ) |  |
|     sps_inter_layer_ref_pics_present_flag | u(1) |
|   sps_log2_ctu_size_minus5 | u(2) |
|   sps_subpic_info_present_flag | u(1) |
|   if( sps_subpic_info_present_flag ) { |  |
|     if( sps_inter_layer_ref_pics_present_flag ) |  |
|       sps_inferred_subpic_info_flag | u(1) |
|     if( sps_inferred_subpic_info_flag ) |  |
|       sps_inferred_subpic_info_ref_layer_idx | ue(v) |
|     else { |  |
|       sps_num_subpics_minus1 | ue(v) |
|       if( sps_num_subpics_minus1 > 0 ) |  |
|         sps_independent_subpics_flag | u(1) |
|       for( i = 0; sps_num_subpics_minus1 > 0 && i <= sps_num_subpics_minus1; i++ ) { |  |
|         if( i > 0 && sps_pic_width_max_in_luma_samples > CtbSizeY ) |  |
|           sps_subpic_ctu_top_left_x[ i ] | u(v) |
|         if( i > 0 && sps_pic_height_max_in_luma_samples > CtbSizeY ) { |  |
|           sps_subpic_ctu_top_left_y[ i ] | u(v) |
|         if( i < sps_num_subpics_minus1 && |  |
|           sps_pic_width_max_in_luma_samples > CtbSizeY ) |  |
|           sps_subpic_width_minus1[ i ] | u(v) |
|         if( i < sps_num_subpics_minus1 && |  |
|           sps_pic_height_max_in_luma_samples > CtbSizeY ) |  |
|           sps_subpic_height_minus1[ i ] | u(v) |
|         if( !sps_independent_subpics_flag) { |  |
|           sps_subpic_treated_as_pic_flag[ i ] | u(1) |
|           sps_loop_filter_across_subpic_enabled_flag[ i ] | u(1) |
|         } |  |
|       } |  |
|     sps_subpic_id_len_minus1 | ue(v) |
|     sps_subpic_id_mapping_explicitly_signalled_flag | u(1) |
|     if( sps_subpic_id_mapping_explicitly_signalled_flag ) { |  |
|       sps_subpic_id_mapping_present_flag | u(1) |
|       if( sps_subpic_id_mapping_present_flag ) |  |
|         for( i = 0; i <= sps_num_subpics_minus1; i++ ) |  |
|           sps_subpic_id[ i ] | u(v) |
|     } |  |
|     } |  |
|   } |  |
|   ... |  |
|   ~~if( sps_video_parameter_set_id > 0 )~~ |  |
|     ~~sps_inter_layer_ref_pics_present_flag~~ | ~~u(1)~~ |
|   sps_idr_rpl_present_flag | u(1) |
|   sps_rpl1_same_as_rpl0_flag | u(1) |
|   ... |  |
| } |  |

7.4.3.3 Sequence Parameter Set RBSP Semantics sps_inferred_subpic_info_flag equal to 1 specifies that the sps_inferred_subpic_info_ref_layer_idx syntax element is present in the SPS. sps_inferred_subpic_info_flag equal to 0 specifies that the sps_inferred_subpic_info_ref_layer_idx syntax element is not present in the SPS. When not present, sps_inferred_subpic_info_flag is inferred to be equal to 0.

sps_inferred_subpic_info_ref_layer_idx specifies the index to the list of the direct reference layers. The value of sps_inferred_subpic_info_ref_layer_idx shall be in the range of 0 to NumDirectRefLayers[GeneralLayerIdx[nuh_layer_id]]-1, inclusive.

When sps_inferred_subic_info_flag is equal to 1 and nuh_layer_id equal to a particular value layerId, the following applies:

The value of each of syntax elements sps_num_subpics_minus1, sps_independent_subpics_flag, sps_subpic_id_len_minus1, sps_subpic_id_mapping_explicitly_signalled_flag, and sps_subpic_id_mapping_present_flag is inferred to be equal to the value of each corresponding syntax element in the SPS that is referred to by the direct reference layer with nuh_layer_id equal to vps_layer_id[DirectRefLayerIdx[GeneralLayerIdx[layerId]][sps_inferred_subpic_info_ref_layer_idx]].

The value of each of syntax elements sps_subpic_ctu_top_left_x[i], sps_subpic_ctu_top_left_y[i], sps_subpic_width_minus1[i], sps_subpic_height_minus1[i], sps_subpic_treated_as_pic_flag[i], sps_loop_filter_across_subpic_enabled_flag[i], and sps_subpic_id[i] is inferred to be equal to the value of each corresponding syntax element in the SPS that is referred to by the direct reference layer with nuh_layer_id equal to vps_layer_id[DirectRefLayerIdx[GeneralLayerIdx [layerId]][sps_inferred_subpic_info_ref_layer_idx]] for i ranging from 0 to sps_num_subpics_minus1, inclusive.

It is a requirement of bitstream conformance that the value of each of syntax elements sps_subpic_info_present_flag, sps_log2_ctu_size_minus5, sps_pic_width_max_in_luma_samples, and sps_pic_height_max_in_luma_samples is equal to the value of each corresponding syntax element in the SPS that is referred to by the direct reference layer with nuh_layer_id equal to vps_layer_id[DirectRefLayerIdx[GeneralLayerIdx[layerId]][sps_inferred_subpic_info_ref_layer_idx]]. sps_subpic_treated_as_pic_flag[i] equal to 1 specifies that the i-th subpicture of each coded picture in the CLVS is treated as a picture in the decoding process excluding in-loop filtering operations. sps_subpic_treated_as_pic_flag[i] equal to 0 specifies that the i-th subpicture of each coded picture in the CLVS is not treated as a picture in the decoding process excluding in-loop filtering operaitons. When not present, the value of sps_subpic_treated_as_pic_flag[i] is inferred to be equal to 1.

Exemplary Video Encoder and Video Decoder Implementing Present Invention Embodiments of the present invention may be implemented in encoders and/or decoders. For example, the disclosed methods may be implemented in one or a combination of an entropy encoding module and a high-level syntax encoding module of an encoder, and/or an entropy decoding module and a high-level syntax decoding module of a decoder. Alternatively, any of the disclosed methods may be implemented as a circuit coupled to the entropy encoding module or the high-level syntax encoding module of the encoder and/or the entropy decoding module or the high-level syntax decoding module of the decoder, so as to provide the information needed by any of the modules. The encoders and decoders are video encoders and video decoders or image encoders and image decoders. When the foregoing proposed method is implemented in image encoders and/or decoders, the resulting bitstream corresponds to one coded frame only using intra-picture prediction. The video encoders have to follow the foregoing syntax design so as to generate a legal bitstream, and the video decoders are able to decode the bitstream correctly only if the parsing process is complied with the foregoing syntax design. When any syntax element is skipped in the bitstream, the video encoders and decoders define the value of the syntax element as an inferred value to guarantee the encoding and decoding results are matched.

Figure 7:
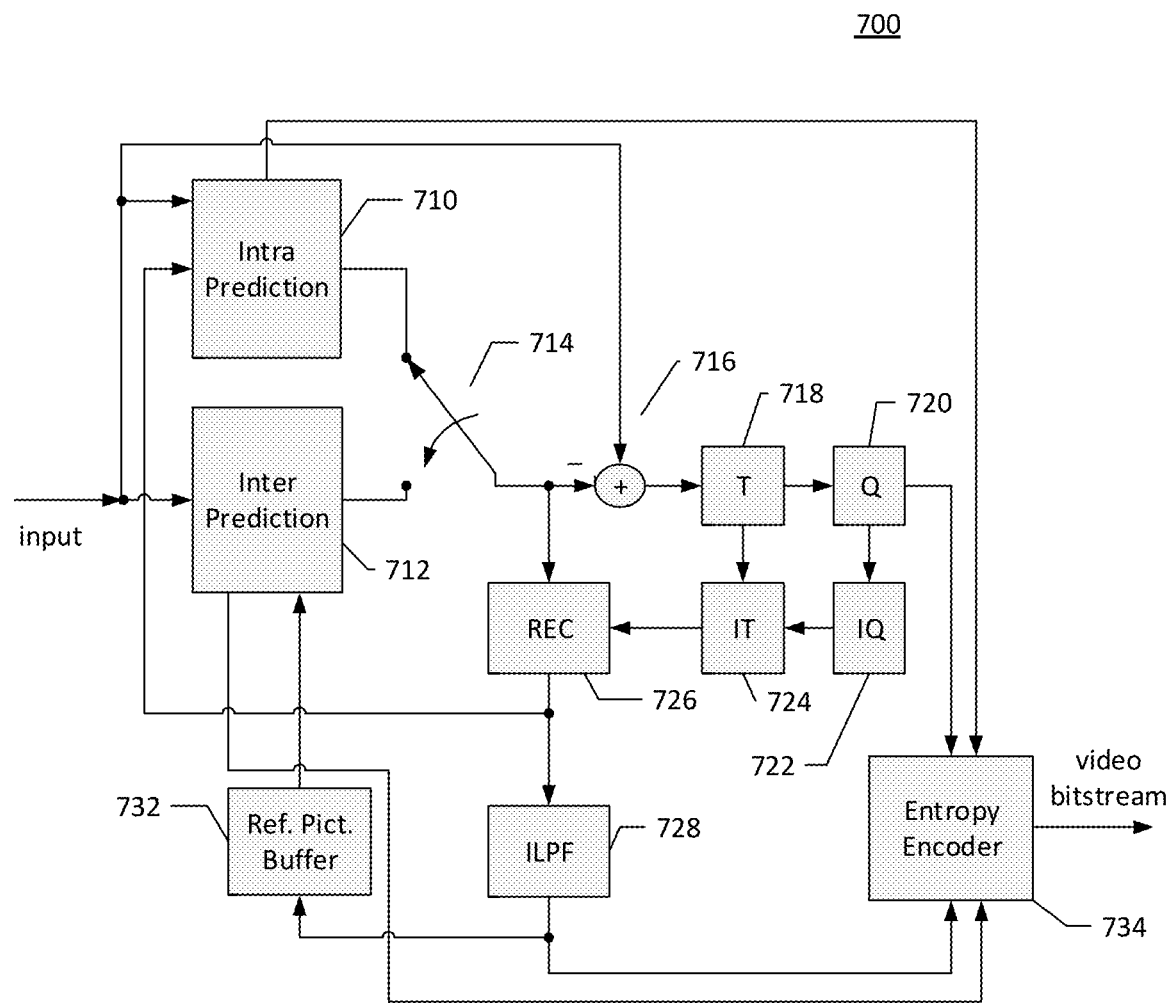
FIG. 7 illustrates an exemplary system block diagram for a video encoding system incorporating the video processing method according to embodiments of the present invention.

FIG. 7 illustrates an exemplary system block diagram for a Video Encoder 700 implementing one or more of the various embodiments of the present invention. The video Encoder 700 receives input video data of a current picture composed of multiple CTUs. Each CTU consists of one block of luma samples together with one or more corresponding blocks of chroma samples. The current picture is partitioned into one or more subpictures, each subpicture includes an integer number of complete CTUs and boundaries of the subpictures are aligned with grids in units of CTUs. An Intra Prediction module 710 provides intra predictors based on reconstructed video data of the current picture. An Inter Prediction module 712 performs Motion Estimation (ME) and Motion Compensation (MC) to provide inter predictors based on referencing video data from other picture or pictures. In some embodiments of the present invention, one or more reference pictures for inter coding the current picture must have a same CTU size as that of the current picture when the current picture is partitioned into multiple subpictures. The reference pictures for inter coding the current picture must also have a same subpicture layout as that of the current picture when the reference picture is not an Inter Layer Reference Picture (ILRP) containing only one subpicture according to some embodiments. Either the Intra Prediction module 710 or Inter Prediction module 712 supplies a selected predictor of a current block of a CTU in the current picture using a switch 714 to an Adder 716 to form residues by subtracting the selected predictor from original video data of the current block. For example, the current block is a Coding Unit (CU). The residues of the current block are further processed by a Transformation module (T) 718 followed by a Quantization module (Q) 720. The transformed and quantized residual signal is then encoded by Entropy Encoder 734 to form a video bitstream. The transformed and quantized residual signal of the current block is processed by an Inverse Quantization module (IQ) 722 and an Inverse Transformation module (IT) 724 to recover the prediction residues. As shown in FIG. 7, the residues are recovered by adding back to the selected predictor at a Reconstruction module (REC) 726 to produce reconstructed video data. The reconstructed video data may be stored in a Reference Picture Buffer (Ref. Pict. Buffer) 732 and used for prediction of other pictures. The reconstructed video data from the REC 726 may be subject to various impairments due to the encoding processing, consequently, at least one In-loop Processing Filter (ILPF) 728 is conditionally applied to the reconstructed video data before storing in the Reference Picture Buffer 732 to further enhance picture quality. A deblocking filter is an example of the ILPF 728. Syntax elements are provided to an Entropy Encoder 734 for incorporation into the video bitstream.

Figure 8:
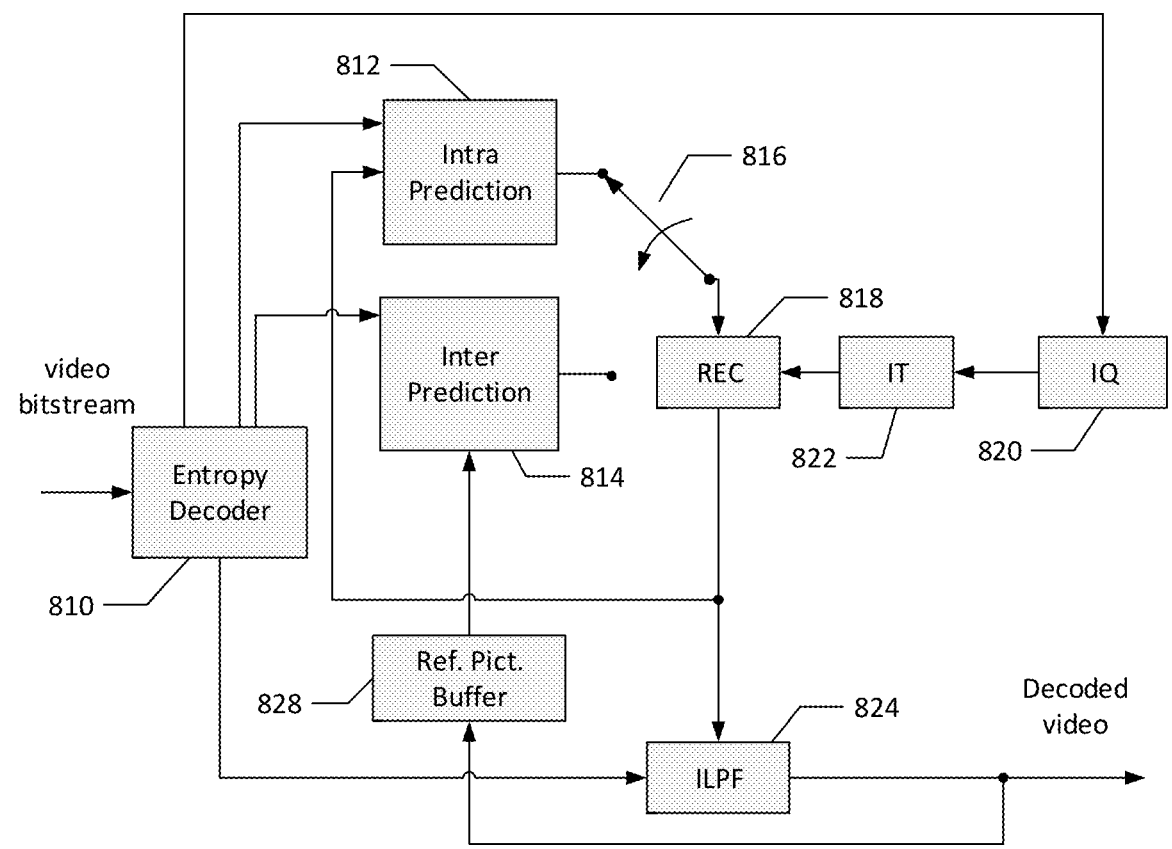
FIG. 8 illustrates an exemplary system block diagram for a video decoding system incorporating the video processing method according to embodiments of the present invention.

A corresponding Video Decoder 800 for the Video Encoder 700 of FIG. 7 is shown in FIG. 8. The video bitstream encoded by a video encoder is the input to the Video Decoder 800 and is decoded by an Entropy Decoder 810 to parse and recover the transformed and quantized residual signal and other system information of a current picture. The decoding process of the Decoder 800 is similar to the reconstruction loop at the Encoder 700, except the Decoder 800 only requires motion compensation prediction in an Inter Prediction module 814. A current picture partitioned into one or more subpictures is received by the Entropy Decoder 810, where the current picture is composed of multiple CTUs. Each block of each CTU in the current picture is decoded by either an Intra Prediction module 812 or Inter Prediction module 814. A Switch 816 selects an intra predictor from the Intra Prediction module 812 or Inter predictor from the Inter Prediction module 814 according to decoded mode information. In some embodiments, one or more reference pictures for inter coding the current picture containing subpictures must have a same CTU size as that of the current picture when the reference picture is not an ILRP containing only one subpicture. The reference pictures must also have a same subpicture pictures as that of the current picture according to some embodiments. The transformed and quantized residual signal is recovered by an Inverse Quantization module (IQ) 820 and an Inverse Transformation module (IT) 822. The IQ module 820 is also called a de-quantization module. The recovered residual signal is reconstructed by adding back the predictor in a Reconstruction (REC) module 818 to produce reconstructed video. The reconstructed video is further conditionally processed by at least one In-loop Processing Filter (ILPF) 824 to generate final decoded video. A deblocking filter is one example of the ILPFs 824. If the currently decoded picture is a reference picture, the reconstructed video of the currently decoded picture is also stored in a Reference Picture Buffer (Ref. Pict. Buffer) 828 for later pictures in decoding order.

Various components of the Video Encoder 700 and Video Decoder 800 in FIG. 7 and FIG. 8 may be implemented by hardware components, one or more processors configured to execute program instructions stored in a memory, or a combination of hardware and processor. For example, a processor executes program instructions to control inter coding a current picture partitioned into subpictures using one or more reference pictures having a same CTU size as that of the current picture. The processor is equipped with a single or multiple processing cores. In some examples, the processor executes program instructions to perform functions in some components in the Encoder 700 and Decoder 800, and the memory electrically coupled with the processor is used to store the program instructions, information corresponding to the reconstructed images of blocks, and/or intermediate data during the encoding or decoding process. In some examples, the Video Encoder 700 may signal information by including one or more syntax elements in a video bitstream, and the corresponding Video Decoder 800 derives such information by parsing and decoding the one or more syntax elements. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable mediums listed above. As shown in FIGS. 7 and 8, the Encoder 700 and Decoder 800 may be implemented in the same electronic device, so various functional components of the Encoder 700 and Decoder 800 may be shared or reused if implemented in the same electronic device. For example, one or more of the Reconstruction module 726, Inverse Transformation module 724, Inverse Quantization module 722, In-loop Processing Filter 728, and Reference Picture Buffer 732 in FIG. 7 may also be used to function as the Reconstruction module 818, Inverse Transformation module 822, Inverse Quantization module 820, In-loop Processing Filter 824, and Reference Picture Buffer 828 in FIG. 8, respectively.

Embodiments of more efficient video processing methods may be implemented in a circuit integrated into a video compression chip or program code integrated into video compression software to perform the processing described above. For examples, encoding or decoding one or more blocks in the current picture by inter coding may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A video processing method for pictures partitioned into subpictures in a video encoding or decoding system, comprising:
receiving input video data associated with a current picture;
when inter-layer coding is enabled for the current picture, signaling or parsing a first syntax element, wherein the first syntax element indicates whether to infer or predict subpicture information of a current layer of the current picture from a target layer;
when the first syntax element indicates that information of the current layer of the current picture is predicted or inferred from the target layer, signaling or parsing a second syntax element to determine information about the target layer for obtaining the subpicture information of the current layer of the current picture; and
encoding or decoding the current layer of the current picture using the subpicture information of the current layer of the current picture.

2. The method of claim 1, the subpicture information of the current layer of the current picture comprises subpicture layout or subpicture IDs of the current layer of the current picture.

3. An apparatus of video processing method in a video encoding or decoding system, the apparatus comprising:
one or more electronic circuits configured for:
receiving input video data associated with a current picture;
when inter-layer coding is enabled for the current picture, signaling or parsing a first syntax element, wherein the first syntax element indicates whether to infer or predict subpicture information of a current layer of the current picture from a target layer;
when the first syntax element indicates that information of the current layer of the current picture is predicted or inferred from the target layer, signaling or parsing a second syntax element to determine information about the target layer for obtaining the subpicture information of the current layer of the current picture; and
encoding or decoding the current layer of the current picture using the subpicture information of the current layer of the current picture.

4. A non-transitory computer readable medium storing program instruction causing a processing circuit of an apparatus to perform a video processing method for pictures partitioned into subpictures, and the method comprising:
receiving input video data associated with a current picture;
when inter-layer coding is enabled for the current picture, signaling or parsing a first syntax element, wherein the first syntax element indicates whether to infer or predict subpicture information of a current layer of the current picture from a target layer;
when the first syntax element indicates that information of the current layer of the current picture is predicted or inferred from the target layer, signaling or parsing a second syntax element to determine information about the target layer for obtaining the subpicture information of the current layer of the current picture; and
encoding or decoding the current layer of the current picture using the subpicture information of the current layer of the current picture.

* * * * *